United States Patent
White

(10) Patent No.: US 10,326,595 B1
(45) Date of Patent: Jun. 18, 2019

(54) LOAD BALANCING PROBABILISTIC ROBOT DETECTION

(71) Applicant: Amazon Technologies, Inc., Seattle, WA (US)

(72) Inventor: Taylor James White, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 932 days.

(21) Appl. No.: 14/869,298

(22) Filed: Sep. 29, 2015

(51) Int. Cl.
| | | |
|---|---|---|
| *H04L 9/32* | (2006.01) | |
| *G06N 5/04* | (2006.01) | |
| *G06F 16/25* | (2019.01) | |
| *G06F 16/22* | (2019.01) | |

(52) U.S. Cl.
CPC ........ *H04L 9/3236* (2013.01); *G06F 16/2255* (2019.01); *G06F 16/252* (2019.01); *G06N 5/04* (2013.01)

(58) Field of Classification Search
CPC .................................................... H04L 9/3236
See application file for complete search history.

(56) References Cited

U.S. PATENT DOCUMENTS

| | | | | |
|---|---|---|---|---|
| 3,624,455 | A * | 11/1971 | Hillman | G01K 7/25 236/78 R |
| 4,155,426 | A * | 5/1979 | Booker, Jr. | B66B 1/285 187/295 |
| 5,333,047 | A * | 7/1994 | Toyama | G01C 19/721 356/460 |
| 8,850,583 | B1 * | 9/2014 | Nelson | H04L 63/1433 380/44 |
| 9,113,513 | B1 * | 8/2015 | Jungwirth | H05B 33/0815 |
| 9,213,931 | B1 * | 12/2015 | Annan | G06K 19/06 |
| 9,584,385 | B2 * | 2/2017 | Lee | H04L 43/0852 |
| 2006/0271708 | A1 * | 11/2006 | Bolles | G06F 21/552 709/246 |
| 2015/0372875 | A1 * | 12/2015 | Turon | H04W 76/10 370/254 |

OTHER PUBLICATIONS

Doran et al.; A comparison of web robot and human requests; ASONAM '13 Proceedings of the 2013 IEEE/ACM International Conference on Advances in Social Networks Analysis and Mining; pp. 1374-1380; ACM Digital Library (Year: 2013).*

Hayati et al.; Web Spambot Detection Based on Web Navigation Behaviour; Published in: 2010 24th IEEE International Conference on Advanced Information Networking and Applications; Date of Conference: Apr. 20-23, 2010; IEEE Xplore I (Year: 2010).*

* cited by examiner

*Primary Examiner* — Bradley W Holder
(74) *Attorney, Agent, or Firm* — Eversheds Sutherland (US) LLP

(57) ABSTRACT

The systems and methods are directed to load balancing probabilistic robot detection. In some embodiments, a first hashed value of an identifier may be determined based on a first hashing function and a second hashed value of the identifier based on a second hashing function. A first value from an array of integer buckets may be determined using the first hashed value and a second value from the array of integer buckets may be determined using the second hashed value. The first value may be incremented based on determining the first value is less than the second value. The request may be determined to be associated with a robot based on determining the first value is greater than a threshold. Execution of an action may be facilitated based on determining the request is associated with the robot.

18 Claims, 4 Drawing Sheets

LOAD BALANCING PROBABILISTIC ROBOT DETECTION

BACKGROUND

An abundance of information is exchanged, managed, and stored between and by entities, such as vendors, retailers, and the like. Examples of information may include names, addresses, demographic information, payment information, purchase history, user preferences. In some embodiments, entities may wish to process data to identify matches. Current methods for data processing include extensive normalization of data sets, which may involve the use of different machine learning techniques to identify and replace abbreviations and/or acronyms. Such normalizations processes may be time-consuming, cumbersome, and may lead to inaccurate replacements.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
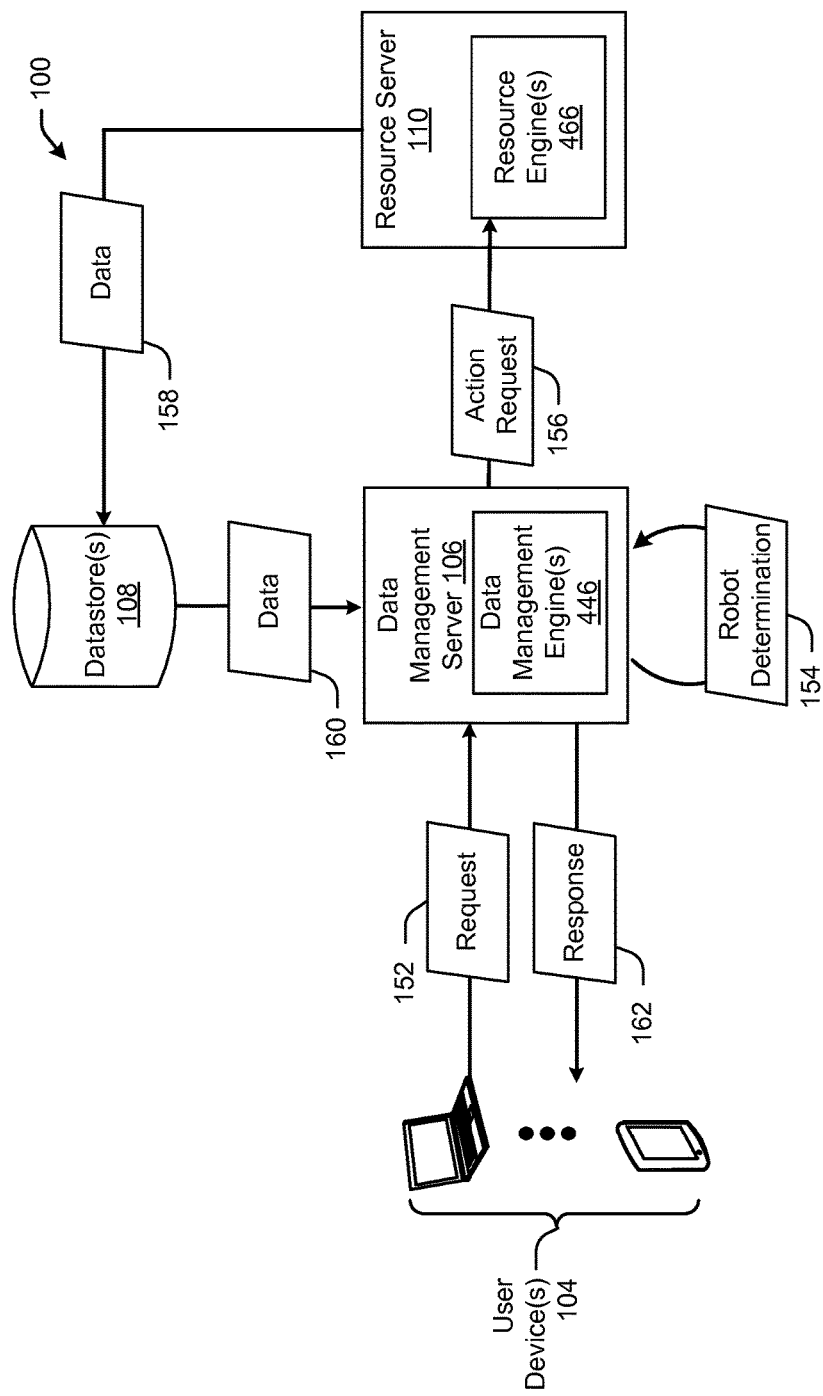
FIG. 1 data flow for a system for load balancing probabilistic robot detection in accordance with one or more embodiments of the disclosure.

This disclosure relates to, among other things, systems, methods, computer-readable media, techniques, and methodologies for load balancing probabilistic robot detection. In some embodiments, a data management server may receive numerous requests for different computing devices. Some of the requests may originate from one or more robots. A robot may be an application that executes automated tasks over one or more networks. The robots may flood the data management server with requests which may negatively impact the bandwidth of resources available for legitimate requests from users. The systems and methods described herein are directed to the use of load balancing probabilistic robot detection techniques to identify requests that may originate from or are generated by robots, which may negatively impact the efficiency of a data management server and the associated computing environment.

In some embodiments, the load balancing probabilistic robot detection techniques may include the use of an array of integer buckets. When a request is received, an identifier associated with the request may be identified. The identifier may then be hashed using two different hashing functions. The hashes may be used to select two buckets from the array of integer buckets. The bucket with the lower value may be incremented.

Additionally, a rolling pointer that travels along the array of integer buckets may be maintained by the data management server. Each time a bucket of the array of integer buckets is incremented due to an incoming request, the value of the bucket to which the rolling pointer is pointing is decremented by one and the value of the rolling pointer is incremented. Once the rolling pointer is pointing to the last integer bucket of the array, the rolling pointer may be reset to the first integer bucket of the array. This strategy is used to ensure that the technique "forgets" older identifier robots which may no longer be relevant.

To prevent divergence, a maximum value may be associated for each bucket of the array of integer buckets. This maximum value may imply a minimum value for each bucket, due to the invariant that the average of all buckets be 0. If a bucket is at the maximum value, then the rolling pointer may be incremented but the value in the bucket that it points to may not be decremented.

In some embodiments, a user device may generate a request for a service and/or content. The data management server may receive the request from the user device. In some embodiments, the request may include an identifier, such as a user identifier, account identifier, or the like. The data management server may obtain the identifier from the request. In some embodiments, the request may not include an identifier and may include metadata or other identifying information (e.g., IP address, MAC address, etc.). If the data management server determines that an identifier is not included in the request but identifies metadata and/or other identifying information from the request, the data management server may use the metadata and/or other identifying information to obtain an identifier. In some embodiments, the data management server may use the metadata and/or other identifying information to retrieve information from another device and/or datastore.

The data management server may determine whether the request is from a robot. In some embodiments, the data management server may use the identifier to determine if the request was generated and/or originated from a robot. In some embodiments, the data management server may generate a first hashed value of the identifier using a hashing function. The data management server may generate a second hashed value of the identifier using a different hashing function. The data management server may obtain a first value from an array of integer buckets using the first hashed value and a second value from the array using the second hashed value. The data management server may select the lower of the two values and may increment the value in the array of integer buckets. If the value in the array of integer buckets is equal to or above a pre-determined threshold, the data management server may determine that the request originated from a robot. If the value in the array of integer buckets is below the pre-determined threshold, the data management server may determine that the request did not originate from a robot.

In some embodiments, the data management server may request an action be executed by one or more resource server(s). The resource server(s) may receive the request and execute the requested action. For example, if the data management server determined the request is not associated with a robot, the requested action may be to execute the requested service and/or retrieve the requested content from the request. If the data management server determined that the request is associated with a robot, then the requested action may be a pre-determined action. For example, the action may be to log the information indicating that the request is from a robot, information associated with the execution of the requested service, or the like. In some embodiments, the action may be to block or deny the execution of the action requested by the robot. In some embodiments, the action may be to defer the requested action or to transfer the requested service to a special fleet of computing devices designated to handle deferred processing.

In some embodiments, the one or more resource server(s) executing the requested action may transmit data to a datastore. In some embodiments, the one or more resource server(s) executing the requested action(s) may generate data. If the data management server determined that the request was not associated with a robot, the data generated may result from the execution of the requested service. If the data management server determined the request was associated with the robot, the data generated may include data generated by one or more pre-determined actions. For example, if the action is to deny the service request, the data may be a notification or indication that the service is denied. If the action is to log that the requester is a robot but fulfill the service request, a log may be generated and/or updated to capture the information. If the action is to defer processing the request, the data may be an indication or identification of a fleet of computing devices that may handle the processing of the request and/or data generated by the fleet of computing devices in response to the request.

In some embodiments, the data management server may retrieve data generated by one or more resource server(s) from the datastore. In some embodiments, the data management server may receive data generated by the one or more resource server(s) from the one or more resource server(s).

In some embodiments, the data management server may generate a response to the request and may transmit the response to the user device. In some embodiments, if the data management server determined the request was not sent by a robot, the response may include a notification that the requested service or action was executed. In some embodiments, the response may include data generated by the requested service and/or action. In some embodiments, the response may include instructions for how to obtain data generated by the requested service and/or action. If the data management server determined that the request was sent by a robot, the response may include a notification of the action taken in response to the detection of the robot (e.g., denial of request for service, deferral of processing of the request, etc.). In some embodiments, the data management server may not sent a response if it was determined that the request was sent by a robot.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Case and Process Flows

FIG. 1 is an illustrative data flow 100 for a system for load balancing probabilistic robot detection in accordance with one or more embodiments of the disclosure. A robot may also be referred to as an Internet bot, web robot, bot or the like. A robot may be an application that executes automated tasks over one or more networks.

At data exchange 152, a user device 104 may generate a request for a service and/or content. The user device(s) 104 may include any suitable device capable of establishing one or more network connections and communicating with one or more data management server(s) 106 to transmit a request for service(s) and/or content and receive data. The user device(s) 104 may include any processor-driven computing device including, but not limited to, a desktop computing device, a laptop computing device, a server, a smartphone, a tablet, and so forth. For ease of explanation, the user device(s) 104 may be described herein in the singular; however, it should be appreciated that multiple user device(s) 104 operable by multiple users may be provided.

In various example embodiments, the data management engine 446 of the data management server 106 may receive a request from a user device 104 for execution of a service and/or retrieval of content. In some embodiments, the request may be transmitted over a secured and/or encrypted network. In some embodiments, the request may include an identifier, such as a user identifier, account identifier, or the like. The data management engine 446 may obtain the identifier from the request. In some embodiments, the request may not include an identifier and may include metadata or other identifying information (e.g., IP address, MAC address, etc.). If the data management engine 446 determines that an identifier is not included in the request but identifies metadata and/or other identifying information from the request, the data management engine 446 may use the metadata and/or other identifying information to obtain an identifier. In some embodiments, the data management engine 446 may use the metadata and/or other identifying information to retrieve information from another device and/or datastore 108.

The data management server(s) 106 may include any processor-driven computing device including, but not limited to, a desktop computing device, a laptop computing device, a server, a smartphone, a tablet, and so forth. For ease of explanation, the data management server(s) 106 may be described herein in the singular; however, it should be appreciated that multiple data management server(s) 106 may be provided.

At data exchange 154, the data management engine 446 may determine whether the request is from a robot. In some embodiments, the data management engine 446 may use the identifier to determine if the request was generated and/or originated from a robot. In some embodiments, the data management engine 446 may generate a first hashed value of the identifier using a hashing function. The data management engine 446 may generate a second hashed value of the identifier using a different hashing function. The data management engine may obtain a first value from an array of integer buckets using the first hashed value and a second value from the array using the second hashed value. The data management engine 446 may select the lower of the two values and may increment the value in the array of integer buckets. If the value in the array of integer buckets is equal to or above a pre-determined threshold, the data management engine 446 may determine that the request originated from a robot. If the value in the array of integer buckets is below the pre-determined threshold, the data management engine 446 may determine that the request did not originate from a robot.

At data exchange 156, the data management engine 446 may request an action be executed by one or more resource server(s) 110. The resource engine 466 may receive the request and execute the requested action. For example, if the data management engine 446 determined the request is not associated with a robot, the requested action may be to execute the requested service and/or retrieve the requested content from the request. If the data management engine 446 determined that the request is associated with a robot, then the requested action may be a pre-determined action. For example, the action may be to log the information indicating that the request is from a robot, information associated with the execution of the requested service, or the like. In some embodiments, the action may be to block or deny the execution of the action requested by the robot. In some embodiments, the action may be to defer the requested action or to transfer the requested service to a special fleet of computing devices designated to handle deferred processing.

The resource server(s) 110 may include any suitable processor-driven computing device including, but not limited to, a desktop computing device, a laptop computing device, a server, a smartphone, a tablet, and so forth. For ease of explanation, the resource server(s) 110 may be described herein in the singular; however, it should be appreciated that multiple resource server(s) 110 may be provided.

At data exchange 158, the one or more resource server(s) 110 executing the requested action may transmit data to a datastore 108. In some embodiments, the one or more resource server(s) 110 executing the requested action(s) may generate data. If the data management engine 446 determined that the request was not associated with a robot, the data generated may result from the execution of the requested service. If the data management engine 446 determined the request was associated with the robot, the data generated may include data generated by one or more pre-determined actions. For example, if the action is to deny the service request, the data may be a notification or indication that the service is denied. If the action is to log that the requester is a robot but fulfill the service request, a log may be generated and/or updated to capture the information. In some embodiments, a service may obtain logs from a plurality of different data management servers 106 and may generate a summary (e.g., graph, diagram, table, etc.) using the logs to depict different types of information associated with the detection of robots (e.g., types of services requested by robots, number of times services are requested by robots, etc.). If the action is to defer processing the request, the data may be an indication or identification of a fleet of computing devices that may handle the processing of the request and/or data generated by the fleet of computing devices in response to the request.

At data exchange 160, the data management engine 446 may retrieve data generated by one or more resource server(s) 110 from the datastore 108. In some embodiments, the data management engine 446 may receive data generated by the one or more resource server(s) 110 from the one or more resource server(s).

At data exchange 162, the data management engine 446 may generate a response to the request from data exchange 152 and may transmit the response to the user device 104. In some embodiments, if the data management engine 446 determined the request was not sent by a robot, the response may include a notification that the requested service or action was executed. In some embodiments, the response may include data generated by the requested service and/or action. In some embodiments, the response may include instructions for how to obtain data generated by the requested service and/or action. If the data management engine 446 determined that the request was sent by a robot, the response may include a notification of the action taken in response to the detection of the robot (e.g., denial of request for service, deferral of processing of the request, etc.). In some embodiments, the data management engine 446 may not sent a response if it was determined that the request was sent by a robot.

Figure 2:
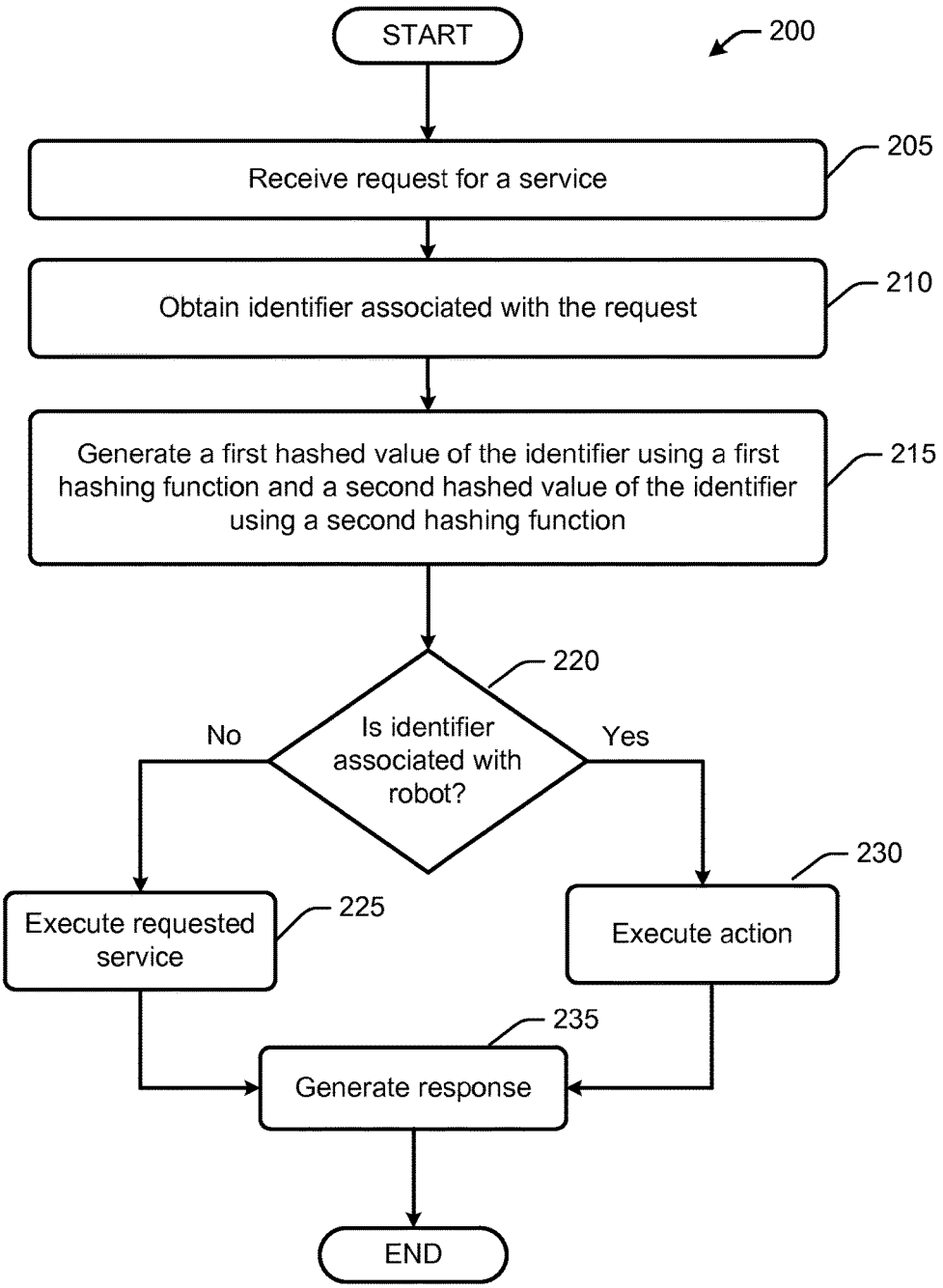
FIG. 2 is an illustrative process flow diagram for a method for load balancing probabilistic robot detection in accordance with one or more embodiments of the disclosure.

FIG. 2 is an illustrative process flow diagram for a method 200 for load balancing probabilistic robot detection in accordance with one or more embodiments of the disclosure. At block 205, a data management engine 446 of a data management server 106 may receive a request for service from a user device 104. Examples of a request for service may include one or remote computing operations, such as but not limited to, access to servers, databases, and other resources that may be used for computing, application execution, networking, content storage, content delivery, database management, or the like, and may include services for websites or client-side applications.

At block 210, the data management engine 446 may obtain an identifier associated with the request. For example, the data management engine 446 may parse or otherwise process the request to obtain the identifier associated with the request. In some embodiments, the identifier may not be included in the request. The data management engine 446 may process the request to obtain metadata or other type of identifying information (e.g., IP address) and may retrieve an identifier associated with the metadata or identifying information.

At block 215, the data management engine 446 may generate a first hashed value of the identifier using a first hashing function and a second hashed value of the identifier using a second hashing function. In some embodiments, the first hashing function and the second hashing function may be independent (e.g., do not rely on each other or are dependent on each other).

At block 220, the data management engine 446 may determine if the identifier is associated with a robot using the first hashed value and the second hashed value. In some embodiments, the data management engine 446 may use the identifier to determine if the request was generated and/or originated from a robot. In some embodiments, the data management engine 446 may generate a first hashed value of the identifier using a hashing function. The data management engine 446 may generate a second hashed value of the identifier using a different hashing function. The data management engine may obtain a first value from an array of integer buckets using the first hashed value and a second value from the array using the second hashed value. The data management engine 446 may select the lower of the two values. If the value in the array of integer buckets is equal to or above a pre-determined threshold, the data management engine 446 may determine that the request originated from a robot. If the value in the array of integer buckets is below the pre-determined threshold, the data management engine 446 may determine that the request did not originate from a robot.

If at block 220, the data management engine 446 determines the identifier is not associated with a robot, the method 200 may proceed to block 225. At block 225, the data management engine 446 may execute the service requested in the request. In some embodiments, the data management engine 446 may transmit a request to one or more resource server(s) 110 to execute the requested service(s) and/or retrieval of content from the response. The method may proceed to block 225.

If at block 220, the data management engine 446 determines the identifier is associated with a robot, the method 200 may proceed to block 230. At block 230, one or more pre-determined actions may be executed. In some embodiments, a pre-determine action may be to log the information indicating that the request is from a robot, information associated with the execution of the requested service, or the like. In some embodiments, the action may be to block or deny the execution of the action requested by the robot. In some embodiments, the action may be to defer the requested action or to transfer the requested service to a special fleet of computing devices designated to handle deferred processing. The method may proceed to block 235.

At block 235, the data management engine 446 may generate a response to the request and may transmit the response to the user device 104.

Figure 3:
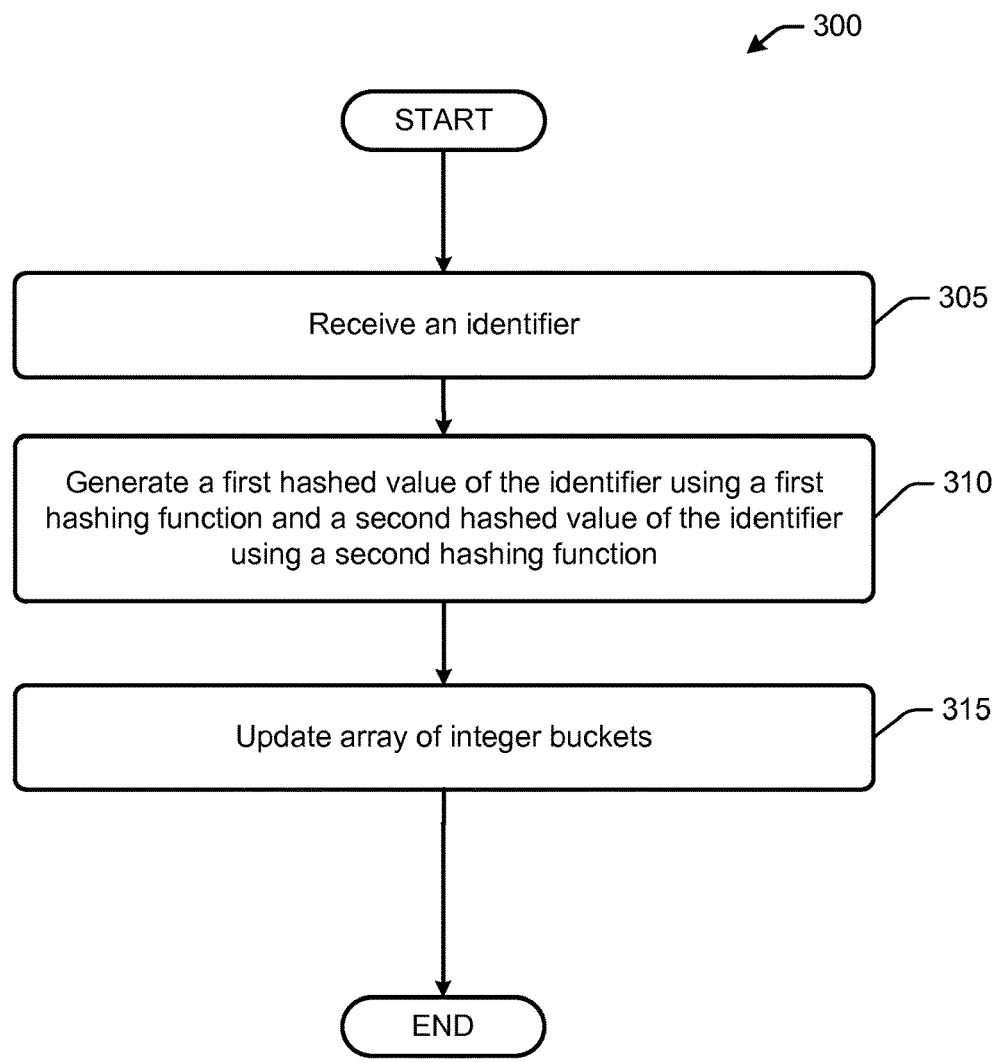
FIG. 3 is an illustrative method for load balancing probabilistic robot detection in accordance with one or more embodiments of the disclosure.

FIG. 3 is an illustrative process flow diagram for a method 300 for load balancing probabilistic robot detection in accordance with one or more embodiments of the disclosure.

At block 305, an identifier may be received by a data management engine 446. In some embodiments, the identifier may be received in a request to initialize or reset the array of integer buckets. In some embodiments, the identifier may be received in a request to reset an integer bucket of the array of integer buckets.

At block 310, the data management engine 446 may generate a first hashed value of the identifier using a first hashing function and a second hashed value of the identifier using a second hashing function. In some embodiments, the first hashing function and the second hashing function may be independent (e.g., do not rely on each other or are dependent on each other).

At block 315, the data management engine 446 may update the array of integer buckets. In some embodiments, the data management engine 446 may obtain values from the array of integer buckets using the first hashed value and the second hashed value. The data management engine 446 may determine that one of the obtained values from the array of integer buckets is lower than the other. The data management engine 446 may then increment the value in the array of integer buckets with the lower value.

In some embodiments, the data management engine 446 may maintain a rolling pointer (e.g., memory pointer). The rolling pointer may traverse along the array of integer buckets. In some embodiments, each time a bucket of the array of integer buckets is incremented due to an incoming request, the value of the bucket to which the rolling pointer is pointing is decremented by one and the value of the rolling pointer is incremented. Once the rolling pointer is pointing to the last integer bucket of the array, the rolling pointer may be reset to the first integer bucket of the array. This ensures that the expected value for any given bucket is 0. Due to the exponential smoothing under assumed random load, this means the maximum value of any bucket is extremely unlikely to exceed 4 in any "reasonable" configuration of the counter (1B buckets max).

To prevent divergence, a maximum value may be set for the buckets of an array of integer buckets. The maximum value may also imply a minimum value for each bucket, due to the invariant that the average of all buckets be 0. If a bucket is at the maximum value, then the rolling pointer is incremented but the value in the bucket that it points to is not decremented.

Illustrative System Architecture

Figure 4:
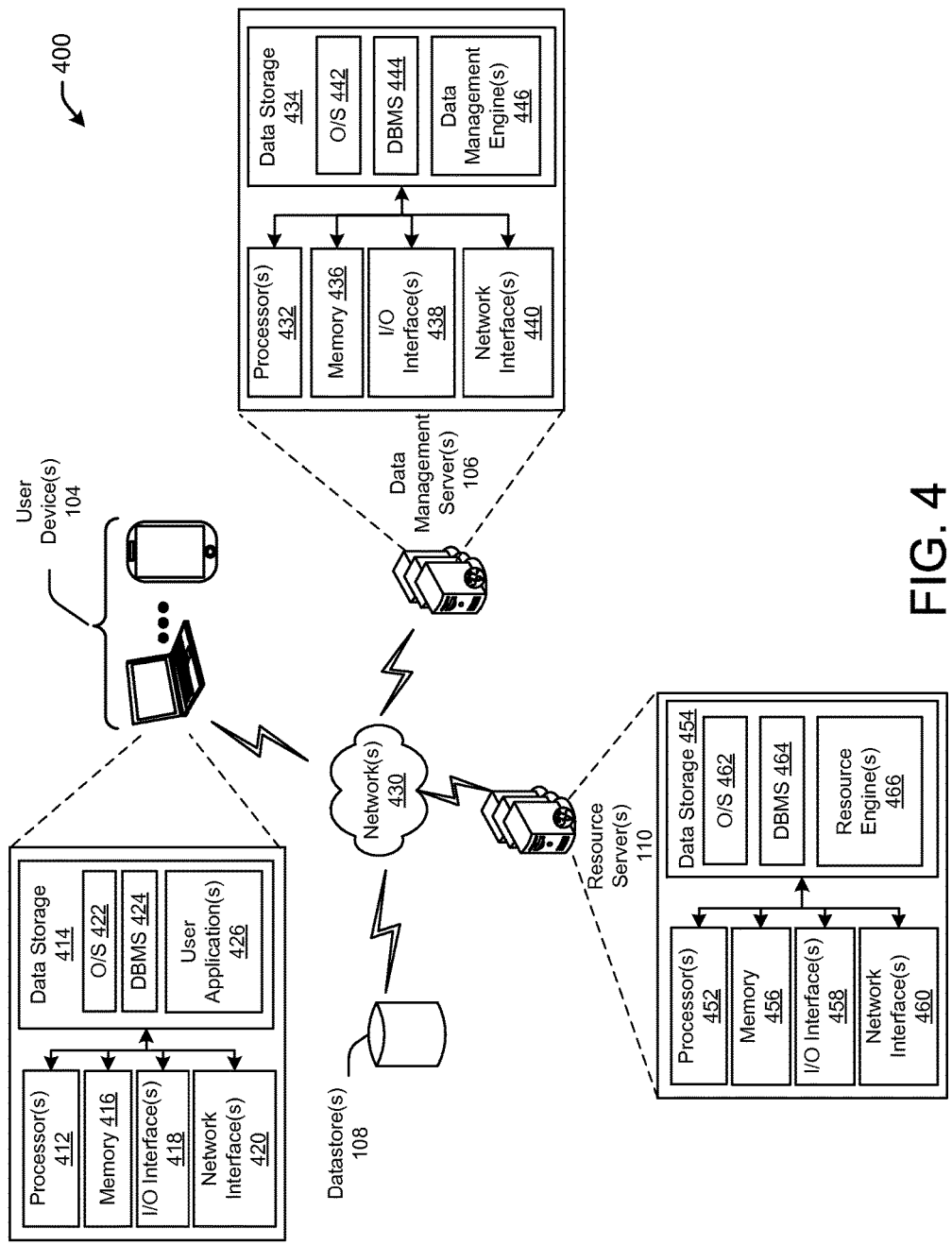
FIG. 4 is a block diagram including various hardware and software components of the illustrative system architecture depicted in FIG. 1 in accordance with one or more embodiments of the disclosure

FIG. 4 is a block diagram including various hardware and software components of the illustrative system architecture 400 depicted in FIG. 1 in accordance with one or more embodiments of the disclosure. FIG. 4 includes one or more user device(s) 104, one or more data management server(s) 106, datastore(s) 108, and/or one or more resource server(s) 110. Each component may be connected via network 430.

Any of the one or more user device(s) 104, one or more data management server(s) 106, datastore(s) 108, and/or one or more resource server(s) 110 may be configured to communicate with each other and any other component of the architecture 400 via one or more network(s) 430. The network(s) 430 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 430 may have any suitable communication range associated therewith and may include, for example, global networks (e.g., the Internet), metropolitan area networks (MANs), wide area networks (WANs), local area networks (LANs), or personal area networks (PANs). In addition, the network(s) 430 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Now referring to the user device(s) 104, the user device(s) 104 may include one or more processors (processor(s)) 412 and one or more memories 416 (referred to herein generically as memory 416). The processor(s) 412 may include any suitable processing unit capable of accepting digital data as input, processing the input data based on stored computer-executable instructions, and generating output data. The computer-executable instructions may be stored, for example, in the data storage 414 and may include, among other things, operating system software and application software. The computer-executable instructions may be retrieved from the data storage 414 and loaded into the memory 416 as needed for execution. The processor(s) 412 may be configured to execute the computer-executable instructions to cause various operations to be performed. The processor(s) 412 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 414 may store program instructions that are loadable and executable by the processor(s) 412, as well as data manipulated and generated by the processor(s) 412 during execution of the program instructions. The program instructions may be loaded into the memory 416 as needed for execution. Depending on the configuration and implementation of the user device(s) 104, the memory 416 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 416 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The user device(s) 104 may further include additional data storage 414 such as removable storage and/or non-removable storage including, but not limited to, magnetic storage, optical disk storage, and/or tape storage. Data storage 414 may provide non-volatile storage of computer-executable instructions and other data. The memory 416 and/or the data storage 414, removable and/or non-removable, are examples of computer-readable storage media (CRSM).

The user device(s) 104 may further include network interface(s) 420 that facilitate communication between the user device(s) 104 and other devices of the illustrative system architecture 400 (e.g., data management server 106, etc.) or application software via the network(s) 430. The user device(s) 104 may additionally include one or more input/output (I/O) interfaces 418 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 414, various program modules, applications, or the like may be stored therein that may comprise computer-executable instructions that when executed by the processor(s) 412 cause various operations to be performed. The memory 416 may have loaded from the data storage 414 one or more operating systems (O/S) 422 that may provide an interface between other application software (e.g., dedicated applications, a browser application, a web-based application, a distributed client-server application, etc.) executing on the user device(s) 104 and the hardware resources of the user device(s) 104. More specifically, the O/S 422 may include a set of computer-executable instructions for managing the hardware resources of the user device(s) 104 and for providing common services to other application programs (e.g., managing memory allocation among various application programs). The O/S 422 may include any operating system now known or which may be developed in the future including, but not limited to, any mobile operating system, desktop or laptop operating system, mainframe operating system, or any other proprietary or open-source operating system.

The data storage 414 may further include one or more database management systems (DBMS) 424 for accessing, retrieving, storing, and/or manipulating data stored in one or more datastores. The DBMS 424 may use any of a variety of database models (e.g., relational model, object model, etc.) and may support any of a variety of query languages.

The data storage 414 may additionally include various other program modules that may include computer-executable instructions for supporting a variety of associated functionality. For example, the data storage 414 may include one or more data user application(s) 426.

The user application(s) 426 may include computer-executable instructions that in response to execution by the processor(s) 412 cause operations to be performed including requesting services and receiving messages or data associated with the requested services, such as videos or audio content. In some embodiments, the user application(s) 426 may be a web browser or a mobile application capable of requesting services, receiving notifications, and processing information received in response to requests for services.

Within the data storage 414, one or more modules may be stored. As used herein, the term module may refer to a functional collection of instructions that may be executed by the one or more processor(s) 412. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Now referring to the data management server(s) 106, the data management server(s) 106 may include one or more processors (processor(s)) 432 and one or more memories 436 (referred to herein generically as memory 436). The processor(s) 432 may include any suitable processing unit capable of accepting digital data as input, processing the input data based on stored computer-executable instructions, and generating output data. The computer-executable instructions may be stored, for example, in the data storage 434 and may include, among other things, operating system software and application software. The computer-executable instructions may be retrieved from the data storage 434 and loaded into the memory 436 as needed for execution. The processor(s) 432 may be configured to execute the computer-executable instructions to cause various operations to be performed. The processor(s) 432 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 434 may store program instructions that are loadable and executable by the processor(s) 432, as well as data manipulated and generated by the processor(s) 432 during execution of the program instructions. The program instructions may be loaded into the memory 436 as needed for execution. Depending on the configuration and implementation of the data management server(s) 106, the memory 436 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 436 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The data management server(s) 106 may further include additional data storage 434 such as removable storage and/or non-removable storage including, but not limited to, magnetic storage, optical disk storage, and/or tape storage. Data storage 434 may provide non-volatile storage of computer-executable instructions and other data. The memory 436 and/or the data storage 434, removable and/or non-removable, are examples of computer-readable storage media (CRSM).

The data management server(s) 106 may further include network interface(s) 440 that facilitate communication between the data management server(s) 106 and other devices of the illustrative system architecture 400 (e.g., user device 104, etc.) or application software via the network(s) 430. The data management server(s) 106 may additionally include one or more input/output (I/O) interfaces 438 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 434, various program modules, applications, or the like may be stored therein that may comprise computer-executable instructions that when executed by the processor(s) 432 cause various operations to be performed. The memory 436 may have loaded from the data storage 434 one or more operating systems (O/S) 442 that may provide an interface between other application software (e.g., dedicated applications, a browser application, a web-based application, a distributed client-server application, etc.) executing on the data management server(s) 106 and the hardware resources of the data management server(s) 106. More specifically, the O/S 442 may include a set of computer-executable instructions for managing the hardware resources of the data management server(s) 106 and for providing common services to other application programs (e.g., managing memory allocation among various application programs). The O/S 442 may include any operating system now known or which may be developed in the future including, but not limited to, any mobile operating system, desktop or laptop operating system, mainframe operating system, or any other proprietary or open-source operating system.

The data storage 434 may further include one or more database management systems (DBMS) 444 for accessing, retrieving, storing, and/or manipulating data stored in one or more datastores. The DBMS 444 may use any of a variety of database models (e.g., relational model, object model, etc.) and may support any of a variety of query languages.

The data storage 434 may additionally include various other program modules that may include computer-executable instructions for supporting a variety of associated functionality. For example, the data storage 434 may include one or more data management engine(s) 446.

The data management engine 446 may include computer-executable instructions that in response to execution by the processor(s) 432 cause operations to be performed including determining whether a request originated from or generated by a robot. In some embodiments, the data management engine 446 may use an identifier to determine if the request was generated and/or originated from a robot. In some embodiments, the data management engine 446 may generate a first hashed value of the identifier using a hashing function. The data management engine 446 may generate a second hashed value of the identifier using a different hashing function. The data management engine may obtain a first value from an array of integer buckets using the first hashed value and a second value from the array using the second hashed value. The data management engine 446 may select the lower of the two values and may increment the value in the array of integer buckets. If the value in the array of integer buckets is equal to or above a pre-determined threshold, the data management engine 446 may determine that the request originated from a robot. If the value in the array of integer buckets is below the pre-determined threshold, the data management engine 446 may determine that the request did not originate from a robot. The data management engine 446 may facilitate execution of the requested service(s) and/or pre-determined actions based on the determination and may generate and transmit a response to a received request for services.

Within the data storage 434, one or more modules may be stored. As used herein, the term module may refer to a functional collection of instructions that may be executed by the one or more processor(s) 432. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Now referring to the resource server(s) 110, the resource server(s) 110 may include one or more processors (processor(s)) 452 and one or more memories 456 (referred to herein generically as memory 456). The processor(s) 452 may include any suitable processing unit capable of accepting digital data as input, processing the input data based on stored computer-executable instructions, and generating output data. The computer-executable instructions may be stored, for example, in the data storage 454 and may include, among other things, operating system software and application software. The computer-executable instructions may be retrieved from the data storage 454 and loaded into the memory 456 as needed for execution. The processor(s) 452 may be configured to execute the computer-executable instructions to cause various operations to be performed. The processor(s) 452 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 454 may store program instructions that are loadable and executable by the processor(s) 452, as well as data manipulated and generated by the processor(s) 452 during execution of the program instructions. The program instructions may be loaded into the memory 456 as needed for execution. Depending on the configuration and implementation of the resource server(s) 110, the memory 456 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 456 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The resource server(s) 110 may further include additional data storage 454 such as removable storage and/or non-removable storage including, but not limited to, magnetic storage, optical disk storage, and/or tape storage. Data storage 454 may provide non-volatile storage of computer-executable instructions and other data. The memory 456 and/or the data storage 454, removable and/or non-removable, are examples of computer-readable storage media (CRSM).

The resource server(s) 110 may further include network interface(s) 460 that facilitate communication between the resource server(s) 110 and other devices of the illustrative system architecture 400 (e.g., data management server(s) 106, etc.) or application software via the network(s) 430. The resource server(s) 110 may additionally include one or more input/output (I/O) interfaces 458 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 454, various program modules, applications, or the like may be stored therein that may comprise computer-executable instructions that when executed by the processor(s) 452 cause various operations to be performed. The memory 456 may have loaded from the data storage 454 one or more operating systems (O/S) 462 that may provide an interface between other application software (e.g., dedicated applications, a browser application, a web-based application, a distributed client-server application, etc.) executing on the resource server(s) 110 and the hardware resources of the resource server(s) 110. More specifically, the O/S 462 may include a set of computer-executable instructions for managing the hardware resources of the resource server(s) 110 and for providing common services to other application programs (e.g., managing memory allocation among various application programs). The O/S 462 may include any operating system now known or which may be developed in the future including, but not limited to, any mobile operating system, desktop or laptop operating system, mainframe operating system, or any other proprietary or open-source operating system.

The data storage 454 may further include one or more database management systems (DBMS) 464 for accessing, retrieving, storing, and/or manipulating data stored in one or more datastores. The DBMS 464 may use any of a variety of database models (e.g., relational model, object model, etc.) and may support any of a variety of query languages.

The data storage 454 may additionally include various other program modules that may include computer-executable instructions for supporting a variety of associated functionality. For example, the data storage 454 may include one or more resource engine(s) 466.

The resource engine 466 may include computer-executable instructions, code, or the like, that, responsive to execution by the processor(s) 452, may cause the resource engine 466 to execute a requested services and/or one or more pre-determined actions based on a request from a data management server 106. In some embodiments, the resource engine 466 may generate data when executing the requested service(s) and/or pre-determined actions. The resource engine 466 may transmit the data to a datastore 108 and/or to the data management server 106.

Within the data storage 454, one or more modules may be stored. As used herein, the term module may refer to a functional collection of instructions that may be executed by the one or more processor(s) 452. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The datastore 108 may be accessible by components of the system 400 to retrieve and or store data as needed by different components of the system 400. While the illustrated embodiment depicts a certain number of components, other embodiments may include additional or fewer components.

Those of ordinary skill in the art will appreciate that any of the components of the system architecture 400 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 400, and the associated functionality that such components support, are merely illustrative and that some components may not be present or additional components may be provided in various embodiments. While various program modules have been depicted and described with respect to various illustrative components of the system architecture 400, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 400 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 400, or additional functionality.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer-readable medium storing computer-executable instructions which, when executed by a processor, cause the processor to perform operations comprising:
   receiving a request for a service from a user device;
   obtaining an identifier associated with the request;
   generating a first hashed value of the identifier using a first hashing function;
   generating a second hashed value of the identifier using a second hashing function;
   determining a first value from an array of integer buckets using the first hashed value and a second value from the array of integer buckets using the second hashed value;
   incrementing the first value based on determining the first value is less than the second value;
   determining the request is associated with a robot based on determining the first value is greater than a threshold; and
   facilitating execution of an action based on determining the request is associated with the robot.

2. The computer-readable medium of claim 1, wherein the operations further comprise:
   identifying a location of the array of integer buckets indicated by a rolling pointer;
   decrementing a value at the location of the array of integer buckets; and
   incrementing the rolling pointer.

3. The computer-readable medium of claim 1, wherein the operations further comprise:
   associating the array of integer buckets with a maximum value for each of the integer buckets.

4. The computer-readable medium of claim 1, wherein the first hashing function is independent from the second hashing function.

5. A computer-implemented method comprising:
   receiving, by one or more processors, a request for a service from a user device;
   determining, by the one or more processors, an identifier associated with the request;
   determining, by the one or more processors, a first hashed value of the identifier based on a first hashing function and a second hashed value of the identifier based on a second hashing function;
   determining, by the one or more processors, a first value from an array of integer buckets using the first hashed value and a second value from the array of integer buckets using the second hashed value;
   incrementing the first value based on determining, by the one or more processors, the first value is less than the second value;
   determining, by the one or more processors, the request is associated with a robot based on determining the first value is greater than a threshold; and
   facilitating, by the one or more processors, execution of an action based on determining the request is associated with the robot.

6. The computer-implemented method of claim 5, wherein the action further comprises:
   updating, by the one or more processors, a log to indicate the request is associated with the robot.

7. The computer-implemented method of claim 6, further comprising:
   transmitting, by the one or more processors, the log to a server; and
   receiving, by the one or more processors, a summary from the server depicting data from the log and a plurality of logs indicative of robot detection by other servers.

8. The computer-implemented method of claim 5, wherein the action further comprises:

deferring, by the one or more processors, a request for a service from the robot, wherein deferring the request comprises requesting the service from a designated deferral fleet of computing devices.

9. The computer-implemented method of claim 5, wherein the action further comprises:

denying, by the one or more processors, a request for a service from the robot.

10. The computer-implemented method of claim 5, further comprise:

identifying, by the one or more processors, a location of the array of integer buckets indicated by a rolling pointer;

decrementing, by the one or more processors, a value at the location of the array of integer buckets; and incrementing, by the one or more processors, the rolling pointer.

11. The computer-implemented method of claim 5, further comprising:

associating, by the one or more processors, the array of integer buckets with a maximum value for each of the integer buckets.

12. A system comprising:

at least one memory that stores computer-executable instructions;

at least one processor configured to access the at least one memory and execute the computer-executable instructions to:

receive a request for a service from a user device;

determine an identifier associated with the request;

determine a first hashed value of the identifier based on a first hashing function and a second hashed value of the identifier based on a second hashing function;

determine a first value from an array of integer buckets using the first hashed value and a second value from the array of integer buckets using the second hashed value;

increment the first value based on determining the first value is less than the second value;

determine the request is associated with a robot based on determining the first value is greater than a threshold; and facilitate execution of an action based on determining the request is associated with the robot.

13. The system of claim 12, wherein the at least one processor is configured to access the at least one memory and to further execute the computer-executable instructions to:

update a log to indicate the request is associated with the robot.

14. The system of claim 13, wherein the at least one processor is configured to access the at least one memory and to further execute the computer-executable instructions to:

transmit the log to a server; and receive a summary from the server depicting data from the log and a plurality of logs indicative of robot detection by other servers.

15. The system of claim 12, wherein the at least one processor is configured to access the at least one memory and to further execute the computer-executable instructions to:

defer a request for a service from the robot, wherein deferring the request comprises requesting the service from a designated deferral fleet of computing devices.

16. The system of claim 12, wherein the at least one processor is configured to access the at least one memory and to further execute the computer-executable instructions to:

deny a request for a service from the robot.

17. The system of claim 12, wherein the at least one processor is configured to access the at least one memory and to further execute the computer-executable instructions to:

identify a location of the array of integer buckets indicated by a rolling pointer;

decrement a value at the location of the array of integer buckets; and increment the rolling pointer.

18. The system of claim 12, wherein the at least one processor is configured to access the at least one memory and to further execute the computer-executable instructions to:

associate the array of integer buckets with a maximum value for each of the integer buckets.

* * * * *